United States Patent
Ramian et al.

(10) Patent No.: US 11,503,019 B2
(45) Date of Patent: Nov. 15, 2022

(54) MULTIUSER MEASUREMENT SYSTEM AND METHOD FOR OPERATING A MULTIUSER MEASUREMENT SYSTEM

(71) Applicant: Rohde & Schwarz GmbH & Co. KG, Munich (DE)

(72) Inventors: Florian Ramian, Karlsfeld (DE); Johannes Steffens, Rosenheim (DE); Luke Cirillo, Poing (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 93 days.

(21) Appl. No.: 16/701,900

(22) Filed: Dec. 3, 2019

(65) Prior Publication Data

US 2020/0106769 A1     Apr. 2, 2020

Related U.S. Application Data

(63) Continuation-in-part of application No. PCT/EP2018/077591, filed on Oct. 10, 2018.

(30) Foreign Application Priority Data

Oct. 12, 2017   (DE) .................. 102017218296.2

(51) Int. Cl.
*H04L 29/06* (2006.01)
*H04L 9/40* (2022.01)
(Continued)

(52) U.S. Cl.
CPC ........ *H04L 63/0853* (2013.01); *G06F 16/245* (2019.01); *G06F 21/31* (2013.01);
(Continued)

(58) Field of Classification Search
CPC ............ H04L 63/0853; H04L 63/0428; H04L 63/083; H04L 63/0861; H04L 63/102;
(Continued)

(56) References Cited

U.S. PATENT DOCUMENTS 8,474,027 B2    6/2013   Meijer et al.
9,032,360 B1    5/2015   Cohen et al.
(Continued)

FOREIGN PATENT DOCUMENTS

CA     2 896 643 A1    7/2014
CN     101871973 A    10/2010
(Continued)

OTHER PUBLICATIONS

International Search Report and Written Opinion for International Application No. PCT/EP2018/077591, dated Feb. 4, 2019, 13 pages.
(Continued)

*Primary Examiner* — Tongoc Tran
(74) *Attorney, Agent, or Firm* — Westman, Champlin & Koehler, P.A.

(57) ABSTRACT

A multiuser measurement system is provided. The multiuser measurement system may authenticate a specific user. When the user has been authenticated, user related data may be obtained from a memory. The user related data are stored in the memory in an encrypted manner, and the encrypted data are only decrypted after authenticating the user.

18 Claims, 2 Drawing Sheets

(51) Int. Cl.
    *G06F 16/245* (2019.01)
    *G06F 21/31* (2013.01)
(52) U.S. Cl.
    CPC ........ *H04L 63/0428* (2013.01); *H04L 63/083* (2013.01); *H04L 63/0861* (2013.01); *H04L 63/102* (2013.01); *H04L 63/105* (2013.01); *H04L 63/1416* (2013.01)
(58) Field of Classification Search
    CPC . H04L 63/105; H04L 63/1416; G06F 16/245; G06F 21/31
    See application file for complete search history.

(56) References Cited

U.S. PATENT DOCUMENTS

| | | | |
|---|---|---|---|
| 9,165,133 | B2 | 10/2015 | La Fever et al. |
| 9,218,470 | B2 | 12/2015 | Domke et al. |
| 9,721,080 | B2 | 8/2017 | Moran et al. |
| 10,996,308 | B2 | 5/2021 | Cheng et al. |
| 11,090,569 | B1 | 8/2021 | Wu et al. |
| 11,216,285 | B2* | 1/2022 | Cheng ................. G06F 16/9566 |
| 2003/0018910 | A1* | 1/2003 | Wert ................... G06F 21/6218 726/27 |
| 2003/0036871 | A1 | 2/2003 | Fuller, III et al. |
| 2006/0265094 | A1 | 11/2006 | Numata |
| 2006/0282660 | A1* | 12/2006 | Varghese ........... G06Q 20/4016 713/155 |
| 2009/0165089 | A1* | 6/2009 | Bennett .................... G06F 21/41 726/3 |
| 2010/0212001 | A1* | 8/2010 | Kashyap .......... H04N 21/42204 726/7 |
| 2011/0302630 | A1 | 12/2011 | Nair et al. |
| 2013/0028478 | A1 | 1/2013 | St-Pierre et al. |
| 2014/0189851 | A1 | 7/2014 | Domke et al. |
| 2015/0205623 | A1 | 7/2015 | DiVincent et al. |

FOREIGN PATENT DOCUMENTS

| | | |
|---|---|---|
| DE | 10 2005 042 830 A1 | 3/2007 |
| DE | 10 2014 007 882 A1 | 11/2015 |

OTHER PUBLICATIONS

European International Search Report, English translation of ISR and Written Opinion for International Application No. PCT/EP2018/077591, dated Apr. 18, 2019, 22 pages.

* cited by examiner

MULTIUSER MEASUREMENT SYSTEM AND METHOD FOR OPERATING A MULTIUSER MEASUREMENT SYSTEM

CROSS-REFERENCE TO RELATED APPLICATION

This Application is a continuation-in-part of International Application No. PCT/EP2018/077591, filed on 10 Oct. 2018, and published as WO 2019/072910 A1 on 18 Apr. 2019, in German, which claims priority to German Patent Application No. 10 2017 218 296.2, filed on 12 Oct. 2017, the contents of which are hereby incorporated by reference.

TECHNICAL FIELD

The present invention relates to a multiuser measurement system and a method for operating a multiuser measurement system.

BACKGROUND

Even though applicable in principle to any multiuser measurement system, the present invention and its underlying problem will be hereinafter described in connection with a measurement device, such as, for example, a network analyzer.

Modern measuring devices usually provide a huge number of complex configuration options. For this purpose, a user may configure the measuring device, for example, by means of a graphical user interface of the like. Due to the huge number of configuration options, the configuration of the measuring device may require a long period of time. Thus, a user may wish to safe the configuration for a later reuse of the respective settings.

Further to this, modern measuring devices may provide the possibility to store measurement results. Accordingly, it is possible to read the stored measurement results at a later point of time. For example, a user may interrupt a measurement operation and switch the measuring device off. Subsequently, the user may turn on the measuring device at a later point in time, for example, a next day, read the previously stored measurement results and the related configuration of the measuring device in order to continue a test procedure or the like.

However, the measuring device may be used by multiple users. In this way, the efficiency and the utilization of the measuring device can be improved. In such a case, there might be a possibility that a further user may read configuration data and/or measurement results of another user.

During development, evaluation and maintenance of electronic devices which are not public available, e.g. devices dealing with confidential data, it must be ensured that data of such confidential devices, which may be measured by a measuring device, may be not available for unauthorized users. Hence, all data relating to measurement or testing such devices have to be limited to a specific user or a specific group of users. In particular, stored measurement results and configuration data for such a test have to be protected from unauthorized access.

Against this background, a problem addressed by the present invention is to provide a multiuser measurement system and a method for operating a multiuser measurement system, which allows a secure handling of confidential data stored in the measurement system. In particular, the present invention aims to provide a secure handling of confidential configuration parameters and measurement results in a multiuser measurement system.

SUMMARY

The present invention solves this object by a multiuser measurement system and a method for operating a multiuser measurement system with the features of the independent claims. Further advantageous embodiments are subject-matter of the dependent claims.

According to a first aspect, a multiuser measurement system is provided. The measurement system comprises a measuring device, an authentication device, a profile memory and a controller. The measuring device is configured to acquire a measurement signal. Additionally, or alternatively, the measuring device may be configured to provide a test signal. In particular, the measuring device may acquire a measurement signal from a device under test and/or provide the test signal to the device under test. The authentication device is configured to authenticate a user. The user may be a user of a group of predetermined users. The authentication may be based on any kind of appropriate authentication procedure. The profile memory may be configured to store user profile data. The user profile data may comprise at least one of a user related configuration data, user related measurement data, user related measurement sequences or user related processed measurement results. In particular, the user related measurement data, measurement sequences or processed measurement results may relate to the measurement signal acquired by the measuring device and/or the test signal provided by the measuring device. The controller is configured to encrypt the user profile data stored in the profile memory. The controller is further configured to decrypt encrypted user profile data stored in the profile memory. In particular, the controller may decrypt encrypted user profile data related to a specific user when the respective specific user is authenticated by the authentication device.

According to a further aspect, a method for operating a multiuser measurement system is provided. The method comprises a step of acquiring a measurement signal. Additionally, or alternatively, the method provides a test signal. The acquisition of the measurement signal and/or the provision of the test signal may be performed by a measuring device. The method further comprises a step of authenticating a user. The authentication of a user may be performed by an authentication device. In particular, a user out of a group of multiple predetermined users may be authenticated. Further, the method comprises a step of storing user profile data in a profile memory. The user profile data may comprise at least one of user related configuration data, user related measurement data, user related measurement sequences or user related processed measurement results. Further, the method may comprise encrypting the user profile data stored in the profile memory. Finally, the method comprises a step of decrypting encrypted user profile data. In particular, encrypted user profile data relating to a specific user may be decrypted, when the respective specific user is authenticated. The encryption of the user profile data and the decryption of the encrypted user profile data may be performed by a controller.

The present invention is based on the finding that modern test systems may be used by multiple different users. Further to this, measuring devices may be used for measuring or testing confidential devices, for example devices under research and development or devices dealing with confidential operations such as secret communication or the like. Thus, when testing such confidential devices, the related configuration of the measuring device and the respective measurement results have to be prevented from unauthorized access. In particular, when using a multiuser measurement system, it must be ensured that the data relating with confidential devices may be only available to a limited group of users.

The present invention takes into account this finding and aims to provide a multiuser measurement system and a method for operating such a multiuser measurement system, which can ensure a confidential handling of measurement results and configuration parameters of the measurement system. It is for this purpose that the measurement system requires an authentication of users. Only if a specific user has been authenticated, the respective user gets access to the previously stored configuration data and/or measurement results. To prevent unauthorized access to the confidential data, the confidential data are stored in an encrypted manner. Only when an authorized user has been detected, the respective data for such a user are decrypted temporarily. Hence, as long as no authentication of a user has been performed, all data remain encrypted. In this way, an unauthorized access to confidential data can be prevented.

The measuring device, the authentication device, the profile memory and the controller may be all arranged in a common housing. For example, the authentication device, the profile memory and the controller may be included in the housing of the measuring device. However, it may be also possible that the devices may be included in separate housings. For example, the measuring device may be communicatively coupled with a further unit comprising the authentication device, the controller and the profile memory. In such a configuration, the measuring device may not store any confidential data. In particular, the measuring device may not comprise a memory for a persistent or non-volatile storage of confidential data. Thus, all confidential data may be only stored in a secure manner in the profile memory. It is understood, that any other arrangement for a secure and confidential storage of the user profile data may be also possible.

The measuring device may be any kind of measuring device, for example, a network analyzer, an oscilloscope, a signal generator or any other kind of device for measuring one or more signals from a device under test and/or generating one or more test signals for providing the test signals to the device under test.

The authentication device may be any kind of device for authenticating a user. In particular, the authentication device may authenticate a specific user out of a group of predetermined users. For this purpose, a number of predetermined users may be specified in advance and related authentication device may be provided for each of the users. Accordingly, the authentication device may authenticate a user based on the respective authentication data. As will be described in more detail below, any kind of authentication manner may be possible.

The profile memory may store any kind of appropriate user profile data. As already mentioned above, the user profile data may comprise user related configuration data. The configuration data may be used for configuring the measuring device. For example, the configuration data may relate to a specific configuration or setting of the measuring device. In particular, the configuration data may relate to a configuration for a specific measurement or test operation for measuring or testing a device under test. The configuration data may also specify a specific test sequence for performing a sequence specifying multiple subsequent test operations. The test sequence may specify, for example, specific test signals, which shall be provided to a device under test and/or specific test operations for measuring a response of the device under test. However, it is understood, that the configuration data may comprise also any other kind of specifications for configuring/setting the measuring device and/or specifying desired operations of the measuring device.

Additionally, or alternatively, the user profile data may comprise any kind of data related to signals received by the measuring device and/or provided by the measuring device. For example, a signal sequence of a measurement signal acquired by the measuring device may be stored in the user profile data.

Depending on the application and the further needs, the data may be stored in compressed or uncompressed manner. It may be also possible to store single measurement results such as a maximum value, minimum value, mean value or the like. It may be also possible to store specific measurement values relating to a specific point in time or any other kind of measurement results. Furthermore, it may be also possible to process the acquired measurement signal by the measuring device and to store processed measurement results. For example, it may be possible to determine a signal-to-noise ratio, an error rate, a transmission loss, an attenuation or amplification of a signal or any other kind of computed measurement result. Furthermore, it is understood that any other kind of data relating to an acquired measurement signals and/or provided test signals may be also stored in the user profile data.

The user profile data may be stored in the profile memory in association with a related user. In other words, user profile data, which have been acquired and stored when a specific user has been authenticated, are stored in association with the authenticated user. Furthermore, as will be described in more detail below, it may be also possible that multiple users may relate to a common group. In this case, it may be also possible that the respective user profile data are stored in association with the respective group of users.

As already mentioned above, the user profile data are stored in the profile memory in an encrypted manner. For this purpose, the controller may perform an appropriate encryption of the user profile data before storing the user profile data in the profile memory. In particular, any kind of appropriate encryption may be applied. For example, an individual encryption key may be used for each user. The user specific encryption key may be generated, for example, based on related authentication data of a user. However, any other manner for generating an encryption key or obtaining a user-specific encryption key may be also possible. Furthermore, it may be also possible that a device-specific encryption key is used for encrypting the user profile data. In this way, it can be ensured that the respective data can be only decrypted by the related device. In particular, it may be possible to combine a user-specific encryption key and a device-specific encryption key to improve the security level of the encryption. When a user has been authenticated by the authentication device, the user profile data of the authenticated user may be decrypted by the controller. In particular, the user profile data of the authenticated user may be provided in decrypted manner as long as the respective user is authenticated. For example, the respective data may be decrypted in the profile memory. Alternatively, it may be possible to read the encrypted user profile data from the profile memory, decrypt the encrypted user profile data and temporarily store the decrypted user profile data in a further memory. In particular, the further memory storing the decrypted user profile data may be a volatile memory. In this way, it can be ensured that the decrypted user profile data are lost when the measurement system is switched off.

The controller, the authentication device and/or the measurement device may comprise a general purpose processor with corresponding instructions. In particular, the respective instructions may be stored in a program memory communicatively coupled with the processor. The processor may further execute an operating system that loads and executes the instructions. The processor may be, for example, an Intel processor that runs a Windows or Linux operating system that loads and executes the instructions. Alternatively, the processor may be a processor that runs an embedded operating system that loads and executes the instructions. However, any other configuration for performing the desired operations of the controller, the authentication device and the measurement device may be possible, too.

With the present invention it is therefore possible to provide a multiuser measurement system, which can store and reuse user specific data such as configuration parameters and measurement results. In particular, the user specific data are stored in a secure manner such that unauthorized access from other users can be prevented. It is for this purpose that the user-specific data are stored in an encrypted manner and the encrypted data are only decrypted after a user has been authorized by the measurement system. In this way, it is possible to use the multiuser measurement system by a plurality of different users in such a manner that each user may only have access to its own data.

In a possible embodiment, the authentication device is configured to perform a biometric authentication of a user.

A biometric authentication of a user may be performed, for example, by any kind of biometric parameter related to a specific user. For example, the biometric authentication may be based on an eye scanner, facial recognition, a fingerprint, voice recognition or an infarct scan. However, it is understood, that any other kind of biometrical parameter may be also used for user authentication. For example, the authentication device may comprise an Iris scanner for authenticating a user by his eyes. The authentication device may also comprise, for example, a camera for acquiring an optical image of a user or at least part of the user. For example, a facial recognition may be performed by acquiring an optical image of the face of the user. A hand scanner may be used for identifying a user by a hand of the user. A fingerprint of a user may be acquired, for example, by a fingerprint scanner. In particular, the fingerprint scanner may comprise an ultrasonic sensor for acquiring a fingerprint of a user. Alternatively, any other manner for acquiring a fingerprint of the user may be also possible. The authentication device may also comprise a microphone for acquiring a voice of the user in order to identify the user by its voice. Furthermore, a laser scanner may be used for scanning the user or a part of the body of the user. However, the authentication of the user by one or more biometric properties may be also performed in any other manner. In particular, it is possible to combine multiple biometric parameters in order to authenticate a user.

In a possible embodiment, the authentication device is configured to authenticate a user by a password, a token or an identification item.

For example, the authentication device may provide an input device for receiving an authentication of the user by a user input. For example, the input device may comprise a keyboard, a touch-screen or the like. Accordingly, the user may enter a password, a pin or the like for authentication.

The input device may also comprise an interface for receiving an identification item, for example an ID card comprising a barcode, a magnetic strip, a RFID chip or the like. Furthermore, a user may also enter a storage device, for example an USB stick, a memory card or the like, which stores an authentication sequence for authenticating the user. However, it is understood, that any other authentication manner may be also possible. In particular, the authentication may be based on any kind of non-biometric authentication. Furthermore, it may be also possible to combine a biometric authentication and a non-biometric authentication of a user.

In a possible embodiment, the profile memory may comprise a persistent or non-volatile memory.

A persistent or non-volatile memory may store the stored data even if the respective memory is not provided with electric power. Thus, the encrypted user profile data are stored in such a memory even if the multiuser measurement system is powered off. Since the user profile data are stored in the persistent or non-volatile memory in an encrypted manner, only an authenticated user may have access to the user profile data after power returns. The profile memory may be, for example, a semiconductor providing a non-volatile storage of the user profile data. The profile memory may comprise, for example, a secure data card, a USB memory stick or the like. The profile memory may comprise, for example, a hard disk drive, a solid state drive or any other device for a persistent/non-volatile recording of data.

In a possible embodiment, the profile memory may comprise a local memory and a remote memory. The controller may be configured to download the profile data of the authenticated user from the remote memory to the local memory.

The remote memory may be any kind of storage device or service for remotely storing data. For example, the remote memory may be a storage service of a cloud device or the like. In particular, the remote memory may be connected to the remaining components of the multiuser measurement system by a communication link, such as a wired or wireless network connection. The local memory may comprise, for example, a volatile memory. Accordingly, the user profile data may be stored persistent in the remote memory, and the user profile data of the authenticated user are only temporarily stored in the volatile local memory. In particular, the user profile data may be decrypted after downloading the respective user profile data from the remote memory and before storing the user profile data in a local memory. Accordingly, the local memory may provide the respective user profile data in a decrypted manner.

In a possible embodiment, the controller is configured to set one or more functionalities of the measurement device based on the user profile data of the authenticated user.

For example, the user profile data may be used, at least in part, for configuring the measurement device. For example, a specific measurement operation may be selected and set according to the respective user profile data. It may be also possible to select and configure a generation of a specific test signal, which may be generated by the measurement device. Furthermore, any other setting of the measurement device may be performed based on the related user profile data. For example, it may be possible to configure a specific temporal resolution, amplification, attenuation, a specific measurement mode etc. In other words, the measurement device may be automatically configured based on related configuration parameter of the user profile data related to an authenticated user. In particular, the measurement device may be automatically configured based on the related user profile data when a user has been authenticated. In this way, a user may return to the measurement system, perform an authentication and continue with his work immediately after the authentication without the need of reconfiguring or manually loading any parameters.

In a possible embodiment, the controller is configured to securely delete a predetermined dataset stored in the profile memory.

The predetermined dataset may relate to a dataset comprising the user profile data of a specific user. For example, it may be possible to delete all user profile data of a specific user. Alternatively, it may be possible to delete only part of the user profile data of a specific user. For example, an authenticated user may specify a part of the user profile data, which shall be deleted. By securely deleting the respective dataset, an unauthorized use of this dataset can be prevented. The securely deletion of the dataset can be performed, for example, by overwriting the respective data with further data, in particular random data. In particular, the security can be improved by overwriting the respective data multiple times, for example two times, three times, five times, seven times, etc.

In a possible embodiment, the controller is configured to detect a specific predetermined condition. The controller may be further configured to securely delete a predetermined dataset when the specific condition of the measurement system is detected.

For example, the controller may detect an abnormal condition of the measurement system. Such an abnormal condition may indicate, for example an unauthorized access to user profile data stored in the profile memory. Furthermore, it may be detected that the measurement system, in particular the measurement device or any other component of the measurement system is moved to another spatial position. Furthermore, it may be also possible to monitor an environment of the measurement system, and to detect a change in the environment of the measurement system. For example, it may be detected that a configuration of the test arrangement has been changed, for example, a device under test has been disconnected or further device is connected to the measurement system. Furthermore, it may be detected that the authorized user has been moved away, or another user, in particular an unauthorized user, comes close to the measurement system. Furthermore, it may be possible to monitor the communication connections of the measurement system to further devices. For example, network connections, such as wired or wireless connections may be monitored in order to detect a change in the network. In particular, it may be possible to detect a change in the network address or the like. It is understood, that any other change may be also serve as an indication for a specific condition, which may lead to a deletion of a predetermined dataset stored in the profile memory.

In a possible embodiment, the controller is configured to detect an unauthorized access, in particular an unauthorized access to profile data stored in the profile memory. Accordingly, the controller may perform a predetermined security operation when detecting such an unauthorized access.

For example, an unauthorized access may be an operation of an unauthorized user operating the measurement system. An unauthorized access may be also an access to the measurement system via a communication connection, for example a network connection. However, it is understood, that any other kind of unauthorized access may be also detected. In response to the detection of an unauthorized access, the controller may perform any kind of operation to counter such an attack. For example, the controller may issue an alarm, in particular an optical or acoustical alarm. Furthermore, the controller may disconnect a network connection in order to prevent further access via such a network connection. The controller may further delete specific data, for example the controller may delete the user profile data stored in the profile memory, at least in part. However, it is understood, that the controller may also perform any other kind of operation in order to prevent further access to confidential data such as the user profile data stored in the profile memory.

In a possible embodiment, the measurement system comprises an administration interface. The administration interface may be configured to manage user authentication data. The administration interface may further specify a group of users having access to a common user profile or define specific rights for a predetermined user or a predetermined group of users.

In particular, the administration interface may provide resources for performing any kind of administration of the rights for individual users or groups of users. For example, it may be possible to specify multiple access levels for multiple groups of users. Accordingly, each user may be associated with one of the respective groups and the corresponding access rights. Alternatively, it may be also possible to specify individual rights for each user. Furthermore, it may be possible to manage the users, which may authenticate on the measurement system. In particular, it may be possible to add further users, delete user or to change the rights of already registered users. However, it is understood, that any other further management of users are groups of user may be also possible.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
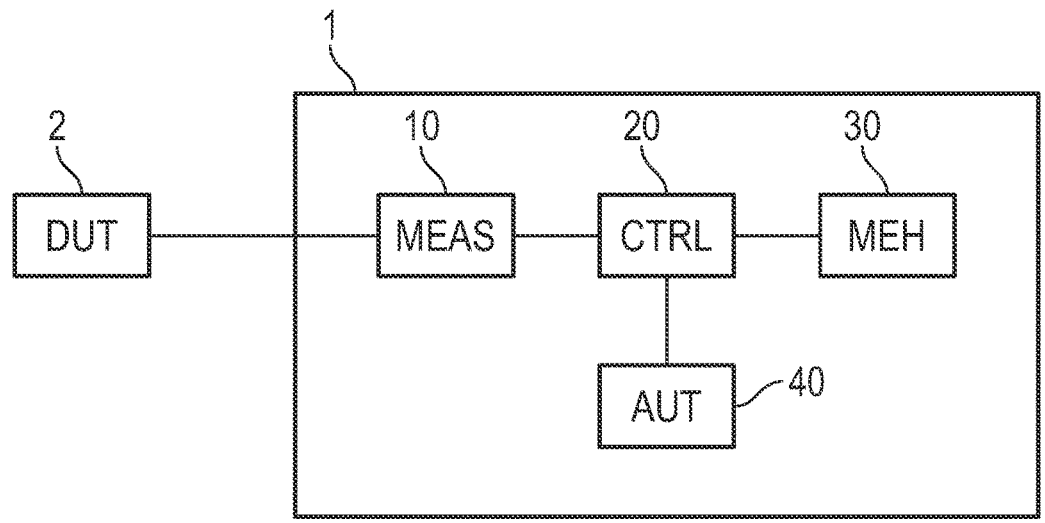
FIG. 1 shows a block diagram of an embodiment of a measurement system according to the present invention.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, same, functionally equivalent and identically operating elements, features and components are provided with like reference signs in each case, unless stated otherwise.

DETAILED DESCRIPTION OF THE DRAWINGS

FIG. 1 shows a multiuser measurement system 1 according to an embodiment. The measurement system 1 comprises a measurement device 10, a controller 20, a profile memory 30 and an authentication device 40. Measurement device 10 may be any kind of measurement device for measuring a signal, for example a signal provided from a device under test 2. Furthermore, measurement device 1 may generate a test signal and provide the generated test signal, for example, to device under test 2. Measurement device 10 may measure any kind of analogue or digital signals. In particular, if analogue signals are measured, the analogue signal may be converted to digital data for a further processing of the acquired signals. For this purpose, measurement device 10 may comprise one or more analogue-to-digital converters. Furthermore, measurement device 10 may comprise any kind of further elements such as filters, amplifiers, attenuators or the like for acquiring and measuring one or more signals. Furthermore, measurement device 10 may comprise one or more signal generators for generating test signals. The test signals may comprise, for example, direct current signals or alternating current signals, in particular radio frequency signals. For example, the generated test signals may be modulated test signals having any kind of modulation. However, it is understood, that any other kind of test signals may be also generated and provided by a measurement device 10.

The acquired one or more measurement signals may be processed in order to evaluate the measurement signals. For example, specific parameters such as a quality indicator, a signal-to-noise ratio, an error rate, minimum or maximum values or the like may be determined. Furthermore, measurement device 10 may acquire a measurement signal sequence relating to a specific period of time. In particular, a start time and/or an end time may be determined according to predetermined trigger events. Furthermore, a range for the acquired measurement signal and/or a range for a period of time, which shall be acquired, may be specified in advance by a user. The user may apply any other setting for configuring the measurement device in order to perform a desired measurement operation and/or to generate one or more specific test signals.

During the measurement or after the measurement has been completed, the results of the measurement operation may be provided to the user. For example, the measurement results may be displayed on a display of measurement device 10. Furthermore, the results may be also provided to a further device (not shown), for example an external monitor or the like.

In order to reuse the configuration of the measurement device 10 at a later point in time, the respective data of a specific configuration may be stored. Accordingly, the stored configuration data can be used for automatically reconfiguring the measurement device 10 at a later point in time.

Furthermore, it may be also possible to store data relating to the measured signals. For example, at least some of the measurement values may be stored, specific measurement sequences may be stored and/or computed results such as a quality indicator, mean values, error rates or the like may be stored. Accordingly, the stored measurement results may be recovered and used for an analysis at a later point in time.

In case that the above described measurement system may be used by more than one user, it may be desirable that some users may not have access to the configuration parameters applied to the measurement device and/or the measurement results of another user. Accordingly, configuration data and/or measurement results of a specific user may be only recovered if the measurement system is operated by the respective user.

For this purpose, an identity of a specific user can be detected by authenticating the respective user. Such an authentication of the user may be performed, for example, by authentication device 40. As will be described in more detail below, the authentication of a user may be performed by any appropriate manner, for example by biometric or non-biometric authentication. For example, one or more users may be specified in advance, for example by an administrator or the like. The administrator may register the users and define appropriate authentication parameters. Accordingly, when a user starts operating the measurement system, the user firstly is authenticated by authentication device 40. After the user has been authenticated, the user may start operating the measurement system 1 based on its user specific data. For example, the user may configure the settings of measurement device 10. Further, the user may perform any kind of measurement or test operation. During the measurement or test operation, the user may store any kind of measurement results, measurement sequences or computational results based on the applied measurements. The respective data of the configuration and/or the measurement may be stored in profile memory 30.

In order to enhance the security of the user related data, which are stored in profile memory 30, controller 20 may encrypt the respective data. For this purpose, any kind of appropriate encryption scheme may be applied. For example, an individual encryption key for each user may be applied. Furthermore, it may be also possible to use a device-specific encryption key, which may be different for each measurement system. In particular, a user-specific encryption key may be combined with a device-specific encryption key to further improve the security level. It is understood, that any other manner for obtaining encryption keys may be also possible. Thus, the user related data stored in profile memory 30 are stored in an encrypted manner. Consequently, the user-specific data may be only available after decrypting the encrypted data for an authenticated user. For this purpose, controller 20 may only decrypt the user related data stored in profile memory 30 when a respective user has been authenticated by means of authentication device 40. Otherwise, the user-specific data are encrypted and are not available for any unauthorized user.

As soon as a specific user has been authenticated, the respective data may be decrypted by controller 20. For this purpose, the respective data may be decrypted in profile memory 30. Accordingly, the decrypted data may be read from profile memory 30 as long as the respective user is authenticated. After the authentication of a user becomes invalid, the controller 20 may automatically encrypt the respective data.

Alternatively, it may be also possible that controller 20 may read the encrypted data from a profile memory 30, decrypt the respective data and store the decrypted data in a further memory, for example a memory included in controller 20. Accordingly, profile memory 30 only stores user-specific data in an encrypted manner, and the respective user-specific data are only available in the further memory as long as the user is authenticated.

For example, profile memory 30 may be a persistent or non-volatile memory. In particular, profile memory 30 may be an integrated circuit such as a memory chip comprising a non-volatile memory. Such kinds of memory are known, for example, from secure data cards or the like. Furthermore, profile memory 30 may be a hard disk drive or a solid state drive for a persistent storage of the encrypted user profile data. Furthermore, after authenticating a specific user, the respective decrypted data may be stored in a volatile memory. Thus, the data of such a volatile memory are automatically lost after the power supply is cancelled.

Based on the above described configuration, a user may authenticate on the measurement system 1 in order to operate the measurement system 1. After the user has authenticated, controller 20 may automatically determine the respective user-specific data stored in profile memory 30 and decrypt the respective data relating to the authenticated user. Furthermore, controller 20 may automatically apply a configuration of measurement device 10 according to the data stored in the user-specific data. Furthermore, controller 30 may also read the latest measurement results relating to the user-specific data and provide the respective measurement results on a display or the like. In this way, the authenticated user can immediately continue his operation, which corresponds to the state of the measurement system before he has left the measurement system the last time.

Figure 2:
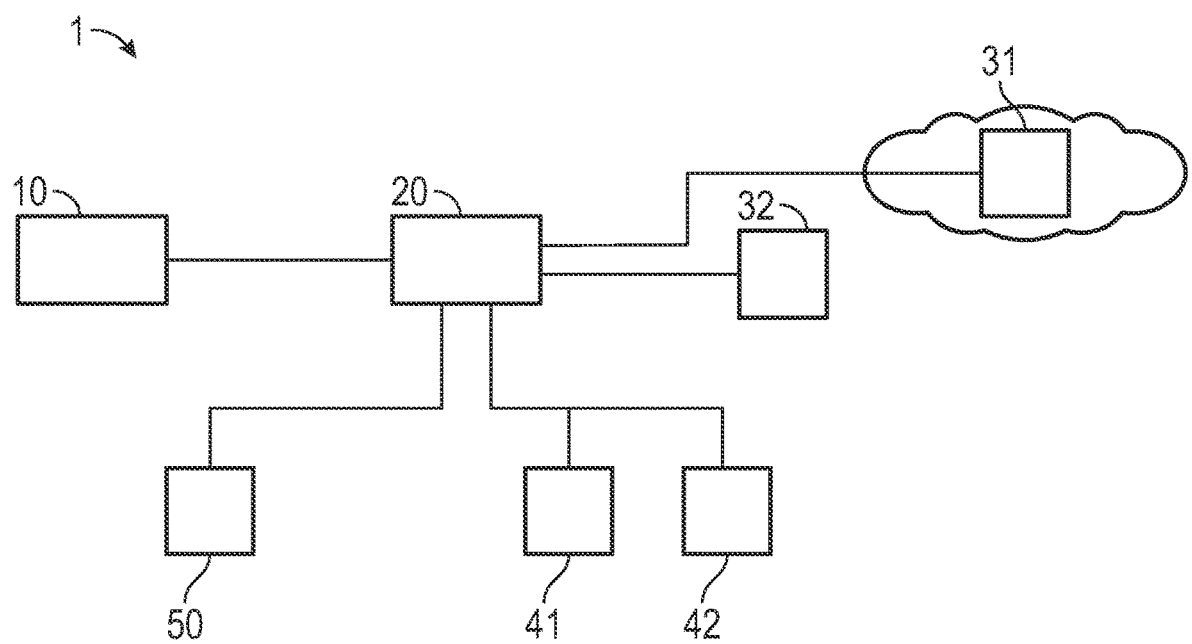
FIG. 2 shows a block diagram of another embodiment of a measurement system according to the present invention.

FIG. 2 shows a measurement system 1 according to a further embodiment. The embodiment according to FIG. 2 mainly corresponds to the previously described embodiment. Thus, all explanations in connection with FIG. 1 also apply to the embodiment of FIG. 2.

As can be further seen in FIG. 2, authentication device 40 may comprise an authentication device 41 for a biometric authentication of a user. Additionally, or alternatively, authentication device 40 may comprise a device 42 for an authentication based on non-biometric data.

For example, a biometric authentication of a user may be performed by means of an Iris scanner, a fingerprint scanner, a camera, a laser scanner, a microphone, etc. For example, an eye of a user may be scanned by means of an Iris scanner in order to identify and authenticate a user. Furthermore, a camera may capture a face of a user or any other unique part of a user in order to apply a face recognition or the like. A hand scanner may scan a hand of a user, a microphone may acquire a voice of a user in order to perform a voice recognition, or a fingerprint scanner may scan a fingerprint of a user. In particular, the fingerprint scanner may comprise an ultrasonic sensor or any other kind of sensor for acquiring a fingerprint. However, it is understood, that any other kind of biometric data may be acquired for identifying and authenticating a user.

A non-biometric authentication may be performed, for example by entering a pin, a combination of a user name and a password or any other appropriate token. For this purpose, the non-biometric authentication device may provide a keyboard or a touch-screen for entering the respective authentication data. Furthermore, it may be possible to use an identification card, for example a card comprising a RFID transponder, a smartcard comprising a chip, or an identification item comprising an optical code such as a QR code or bar code. Furthermore, it may be possible that the non-biometric authentication device 42 may comprise an interface for inserting a storage device such as an USB stick, a secure data card or the like, wherein an authentication token may be stored on the respective device. However, it is understood, that any other kind for non-biometric authentication may be also possible.

As can be further seen in FIG. 2, the profile memory may comprise a remote memory 31. Remote memory 31 may be any kind of storage device, which is spatial separated from the remaining devices. For example, remote memory 31 may be a storage service of a cloud device. Furthermore, remote memory 31 may be any kind of memory, which is connected to controller 20 by means of a communication link such as a wired or wireless network connection or the like. Since the user-specific data are stored in an encrypted manner, an unauthorized access to the remotely stored data can be prevented.

Measurement system 1 may further comprise a local memory 32 for locally storing user related data. For example, the encrypted user related data of an authenticated user may be downloaded from remote memory 31 to local memory 32. In particular, controller 20 may download the encrypted data from remote memory 31, decrypt the downloaded encrypted data and store the decrypted data of the authenticated user in local memory 32. In particular, local memory 32 may be a volatile memory. Thus, the locally stored data in memory 32 are automatically deleted if the system is powered off.

Measurement system 1 may further comprise an administration interface 50. Administration interface 50 may provide capabilities for managing the users, which may authenticate on the measurement system 1. For example, an administrator may add one or more users, which may authenticate on the measurement system 1. Furthermore, it may be possible to delete a user such that the user may no longer authenticate to the measurement system.

It may be further possible to assign specific rights to each registered user. For example, the measurement system 1, in particular measurement device 10 may provide multiple functionalities. In such a case, it may be possible to define the access of the respective functionalities for each user individually. For example, a user may get only limited access to some of the functionalities provided by measurement system 1. It may be also possible to define any other kind of rights for the registered users.

Furthermore, it may be possible to define global policies for access to the functionalities of measurement system 1. Accordingly, such a policy may be assigned to each of the registered users. In particular, it may be possible to specify groups of users. Accordingly, a common policy may be assigned to all users included in such a group. It may be even possible that one user may be a member of multiple groups. In particular, it may be possible to define a group of user such that all users of such a group may have common access to same user related data. It is understood, that any other kind of administration of the users for adding, deleting users or specifying policies may be also possible.

When user related data are no longer required, it may be possible to securely delete the respective data. For example, it may be possible to overwrite the respective data by further data, for example by random data or a predetermined sequence of data. In this way, it can be ensured that the respective data cannot be accessed at a later point in time.

In particular, it may be possible to monitor the measurement system and to limit access to user related data or even to delete user related data depending on the state if the measurement system. For example, it may possible to detect whether a specific configuration property of the measurement system has changed. In a possible example, it may be possible to monitor the connection of the measurement system to further devices, for example to monitor wired and/or wireless network connections. As soon as a change in the network connections has been detected, the measurement system may automatically change to a secure state. For example, a currently authenticated user may be logged off, such that the user has no longer access to the user related data. Accordingly, the user has to re-authenticate in order to continue his operation. Furthermore, it may be possible to issue an alarm, for example an optical and/or acoustical alarm, when a specific condition such as a change in the configuration of the measurement system 1 has been detected.

The above-mentioned monitoring of the measurement system 1 may be not limited only to a change in the network configuration or a connection or disconnection of further devices. Furthermore, any other property may be monitored. For example, a presence of an authenticated user may be monitored. As soon as it is detected that the authenticated user moves away from the measurement system, the authentication of the user may become invalid. Furthermore, it may be also monitored, whether a further user comes close to the measurement system 1. It may be also monitored, whether a spatial position of the measurement system 1, in particular measurement device 10 changes. For example, a global navigation satellite system such as GPS or the like may be used for monitoring the spatial position of the measurement system 1. It may be also possible to monitor a radio frequency environment in order to detect changes in a near-field communication (NFC) or a wireless local area network (WLAN) or to monitor a presence/absence of a Bluetooth transmitter. However, it is understood, that the present invention is not limited to the above-mentioned examples. Furthermore, any other property may be monitored in order to identify changes in the environment or the configuration of the measurement system 1.

As already described above, it may be possible to invalid the authentication of an authenticated user upon detecting a specific condition. Furthermore, it may be possible to issue an alarm such as an optical or acoustical signal or even to delete at least some of the user related data. It may be also possible to apply a disconnection of the measurement system with further communication partners, such as devices, which are connected by a wired or wireless communication link to the measurement system 1.

Especially, if an attack such as an unauthorized access to the user-specific data is detected, an automatic disconnection of network connections, a locking of the measurement system or a shutdown of the measurement system may be applied to prevent an unauthorized access to the respective data.

Figure 3:
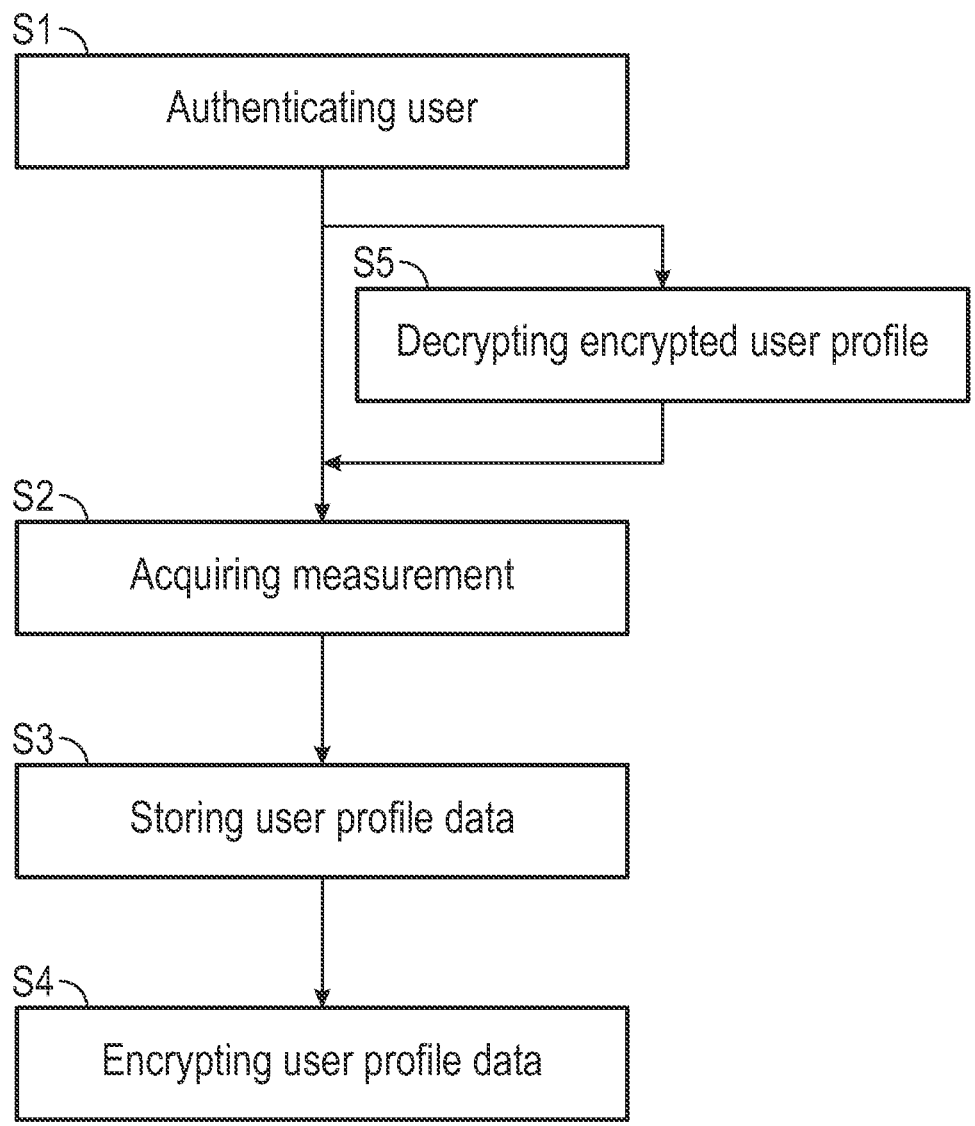
FIG. 3 shows a flow diagram of an embodiment of a method according to the present invention.

FIG. 3 shows a method for operating a multiuser measurement system 1 according to an embodiment. The method may perform any kind of steps, which have been already described above in connection with the multiuser measurement system 1. Furthermore, multiuser measurement system 1 may comprise any kind of device for performing operations as described below in connection with the method for operating the multiuser measurement system 1.

The method may comprise a step S1 of authenticating a user. In particular, the user may be authenticated by an authentication device 40 such as a biometric authentication device 41 and/or a non-biometric authentication device 42.

The method may further comprise a step S2 of acquiring a measurement signal. Additionally, or alternatively, step S2 may provide a test signal. In particular, the acquisition of the measurement signal and/or the provision of the test signal may be performed by a measurement device 10. Accordingly, the test signal may be provided to a device under test 2, and the measurement signal may be acquired from the device under test 2.

Further, in step S3, user profile data are stored in a profile memory 30. The user profile data may comprise, for example, at least one of user related configuration data, user related measurement data, user related measurement sequences or user related process measurement results. However, it is understood, that any other kind of user related data may be also stored in profile memory 30.

In a step S4, the user profile data stored in profile memory 30 are encrypted.

Further, in step S5, the encrypted user profile data related to a specific user are decrypted. In particular, the encrypted user profile data are decrypted when the respective specific user is authenticated. The encryption of the user profile data and the decryption of the encrypted user profile data may be performed, for example, by a controller 20.

The authentication of the user may be performed based on a biometric authentication of the user and/or a non-biometric authentication, in particular based on a password, a token or an authentication item. The authentication item may be, for example, an item such as a key card comprising an optical code, in particular a QR code or bar code, an RFID transponder or the like.

The user profile data may be stored in a persistent or non-volatile memory such as an integrated circuit comprising a non-volatile memory, a solid state disc or a hard disc drive.

The encrypted user profile data may be stored in a remote memory. Accordingly, the encrypted user profile data may be downloaded from the remote memory when a specific user has been authenticated, and the downloaded user profile data may be decrypted and stored in a local memory of the measurement system 1.

The method may further comprise setting functionalities of the measurement system based on the user profile data of an authenticated user.

The method may further comprise securely deleting predetermined data sets of user profile data stored in the profile memory. In particular, the security deleting of the predetermined dataset may comprise detecting a specific condition of the measurement system 1 and securely deleting the dataset when the specific condition is detected.

The method may further comprise detecting an unauthorized access to profile data stored in the profile memory and performing a predetermined security operation when an unauthorized access is detected.

The method may further comprise providing an administration interface. The administration interface may manage a user authentication data, specify a group of users having access to a common user profile or defining specific rights for a predetermined user or a predetermined group of users.

Summarizing, the present invention relates to a multiuser measurement system. The multiuser measurement system may authenticate a specific user. When the user has been authenticated, user related data may be obtained from a memory. The user related data are stored in the memory in an encrypted manner, and the encrypted data are only decrypted after authenticating the user.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 1 measurement system
10 measurement device
20 controller
30 profile memory
31 remote memory
32 local memory
40 authentication device
41 biometric authentication device
42 non-biometric authentication device
50 administration interface
S1-S5 method steps

The invention claimed is:

1. A multiuser measurement system, comprising:
a measurement device for acquiring a measurement signal or providing a test signal;
an authentication device for authenticating a user;
a profile memory for storing user profile data, the user profile data comprise user related measurement data, user related measurement sequences and user related processed measurement results related to the measurement signal and/or the test signal acquired by the measurement device; and
a controller for encrypting the user profile data stored in the profile memory and for decrypting encrypted user profile data related to a user when the respective user is authenticated by said authentication device; and
wherein the controller is configured to set one or more functionalities of the measurement device based on the user profile data of an authenticated user.

2. The system of claim 1, wherein the authentication device is configured to perform a biometric authentication of a user.

3. The system of claim 1, wherein the authentication device is configured to authenticate a user based on a pass-word, a token or an authentication item.

4. The system of claim 1, wherein the profile memory is a persistent or non-volatile memory.

5. The system of claim 1, wherein the profile memory comprises a local memory and a remote memory, and wherein the controller is configured to download the profile data of an authenticated user from the remote memory to the local memory.

6. The system of claim 1, wherein the controller is configured to securely delete a predetermined dataset stored in the profile memory.

7. The system of claim 6, wherein the controller is configured to securely delete the predetermined dataset when a specific condition of the measurement system is detected.

8. The system of claim 1, wherein the controller is configured to detect an unauthorized access to profile data stored in the profile memory and to perform a predetermined security operation when an unauthorized access is detected.

9. The system of claim 1, comprising an administration interface for managing user authentication data, specifying a group of users having access to a common user profile or defining specific rights for a predetermined user or a predetermined group of users.

10. A method for operating a multiuser measurement system, the method comprising:
authenticating a user by an authentication device;
acquiring a measurement signal or providing a test signal by a measurement device;
storing user profile data in a profile memory, wherein the user profile data comprise user related measurement data, user related measurement sequences and user related processed measurement results related to the measurement signal and/or the test signal acquired by the measurement device;
encrypting the user profile data stored in the profile memory by a controller; and
decrypting encrypted user profile data related to a user by the controller, when the respective user is authenticated by said authentication device, and further comprising:
setting functionalities of the measurement device based on the user profile data of an authenticated user.

11. The method of claim 10, wherein the authentication is performed based on a biometric authentication of a user.

12. The method of claim 10, wherein the authentication is performed based on a password, a token or an authentication item.

13. The method of claim 10, wherein the user profile data are stored in a persistent or non-volatile memory.

14. The method of claim 10, wherein storing the user profile data comprises:
storing the encrypted user profile data in a remote memory,
downloading the encrypted user profile data of an authenticated user from the remote memory,
decrypting the downloaded encrypted user profile data, and
storing the decrypted user profile a data in a local memory of the measurement system.

15. The method of claim 10, comprising securely deleting a predetermined dataset of the user profile data stored in the profile memory.

16. The method of claim 15, wherein securely deleting a predetermined dataset comprises detecting a specific condition of the measurement system, and securely deleting the predetermined dataset when the specific condition is detected.

17. The method of claim 10, comprising detecting an unauthorized access to profile data stored in the profile memory and performing a predetermined security operation when an unauthorized access is detected.

18. The method of claim 10, comprising providing an ad-ministration interface for managing user authentication data, specifying a group of users having access to a common user profile, or defining specific rights for a predetermined user or a predetermined group of users.

* * * * *